US012640018B2

(12) United States Patent
Bleakley et al.

(10) Patent No.: US 12,640,018 B2
(45) Date of Patent: May 26, 2026

(54) ITEM DETECTION AND ESTIMATION SYSTEM

(71) Applicant: Toshiba Global Commerce Solutions, Inc., Durham, NC (US)

(72) Inventors: Suzanne M. Bleakley, Cary, NC (US); Abenezer Tasissa, Cary, NC (US); Pawita Sunthornpong, Durham, NC (US); Shahil Manoj Dhotre, Raleigh, NC (US); Shubham Dilip Bhoir, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 103 days.

(21) Appl. No.: 18/491,094

(22) Filed: Oct. 20, 2023

(65) Prior Publication Data

US 2025/0131801 A1      Apr. 24, 2025

(51) Int. Cl.
*G07G 3/00* (2006.01)
*G06Q 20/20* (2012.01)

(52) U.S. Cl.
CPC ........... *G07G 3/003* (2013.01); *G06Q 20/208* (2013.01)

(58) Field of Classification Search
CPC .... G07G 3/003; G07G 1/0036; G07G 1/0063; G07G 1/0072; G06Q 20/208; G06Q 20/18; G01G 19/4144; G06V 20/52; G06V 20/68
USPC .......................................................... 705/23
See application file for complete search history.

(56) References Cited

U.S. PATENT DOCUMENTS

| | | | |
|---|---|---|---|
| 8,552,313 B2 | 10/2013 | Atwater et al. | |
| 2023/0109436 A1* | 4/2023 | Wilson ................. | G07G 1/0036 |
| | | | 705/22 |
| 2025/0046161 A1* | 2/2025 | Whitelaw .......... | G01G 19/4144 |

* cited by examiner

*Primary Examiner* — Garcia Ade
(74) *Attorney, Agent, or Firm* — Stanek Lemon Crouse & Meeks, PA

(57) ABSTRACT

A method is provided. The method includes receiving image information corresponding to a point-of-sale (POS) transaction, the image information includes an item being weighed, receiving an indication of an item weight or an indication of an item identifier for the item associated with the POS transaction, determining an expected item weight or an expected item identifier for the item based on the image information, determining a condition exists between an item weight and the expected item weight or between an item identifier and the expected item identifier and managing the POS transaction based on the condition. A system is also provided.

18 Claims, 7 Drawing Sheets

100

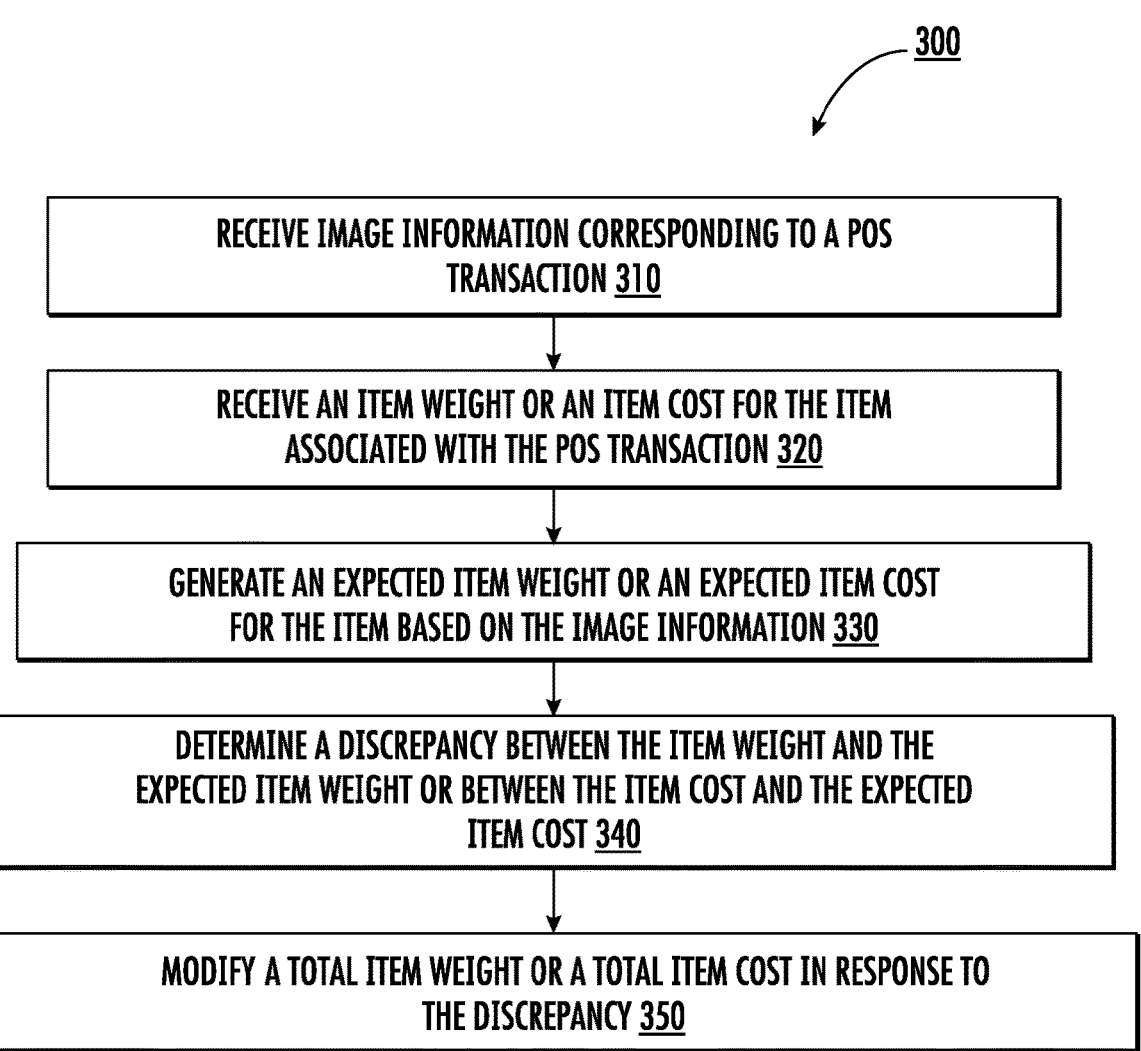

_300_

RECEIVE IMAGE INFORMATION CORRESPONDING TO A POS TRANSACTION _310_

RECEIVE AN ITEM WEIGHT OR AN ITEM COST FOR THE ITEM ASSOCIATED WITH THE POS TRANSACTION _320_

GENERATE AN EXPECTED ITEM WEIGHT OR AN EXPECTED ITEM COST FOR THE ITEM BASED ON THE IMAGE INFORMATION _330_

DETERMINE A DISCREPANCY BETWEEN THE ITEM WEIGHT AND THE EXPECTED ITEM WEIGHT OR BETWEEN THE ITEM COST AND THE EXPECTED ITEM COST _340_

MODIFY A TOTAL ITEM WEIGHT OR A TOTAL ITEM COST IN RESPONSE TO THE DISCREPANCY _350_

FIG. 6

ITEM DETECTION AND ESTIMATION SYSTEM

BACKGROUND

Self-checkout stations are commonly used by consumers at retail locations such as grocery stores. In operation, customers can scan items at the self-checkout system and place the scanned items on a conveyor of the self-checkout system. Some items, such as produce, are sold by weight. When purchasing these items, customers must place the item on the scale and enter information into the self-checkout station identifying the item, for example, using a produce code or scanning an item barcode. Errors in the self-checkout process may occur when a customer incorrectly identifies the item, omits scanning the item altogether or otherwise improperly weighs or scans the item. These errors may result in lost sales also known as "shrinkage."

BRIEF DESCRIPTION OF THE SEVERAL VIEWS OF THE DRAWINGS

The present disclosure will be explained with reference to the following figures in which:

FIG. 6 is a flow diagram illustrative of a routine in accordance with some embodiments of the present disclosure.

DETAILED DESCRIPTION

At retail and grocery stores some items, such as produce, are sold by weight. In both traditional checkout lanes and self-checkout lanes, produce is placed on a weighing surface or weighing platter of a scale. The scale weighs the item. The consumer or store employee then inputs an item identification code which may include a stock-keeping unit (SKU) into the point-of-sale system via a user interface. The weight of the item, the unit price and the resulting price of the weighed item are shown on a display to the consumer or store employee.

Errors in the checkout process may occur when a customer or store employee incorrectly identifies an item and/or does not weigh the item properly. The consumer or store employee may fail to place the entire item on the scale or weighing platter resulting in an inaccurate weight measurement. A portion of the item may go beyond the weighing platter, accidentally or intentionally. These errors may result in lost sales or shrinkage. In accordance with some embodiments of the present disclosure, in order to reduce shrinkage and address other deficiencies during a point-of-sale ("POS") transaction, the POS system is able to detect errors in weighing, scanning and purchasing items.

In some examples, when using a self-checkout station at a grocery store, a consumer may place a bag of apples on the weighing platter of the scale. The bag may include eight apples yet be positioned in such a way that only six apples are on the weighing platter. Two apples may rest on a counter adjacent to the weighing platter, for example. Consequently, the scale may not measure the full weight of the whole bag of apples; rather, the scale will measure the weight of only the six apples on the weighing platter. Thus, the customer will be charged for six apples when eight apples were intended to be purchased. In accordance with the present disclosure, images and/or computer vision may be used to recognize that a partial or incomplete amount of the item is being weighed. In this example, a camera at the checkout station can detect that six apples were on the weighing surface, yet two apples were in proximity to the weighing platter and intended for purchase. Subsequently, the POS system can determine that eight apples are part of the POS transaction and update the transaction details accordingly, editing the quantity from six to eight.

Figure 1:
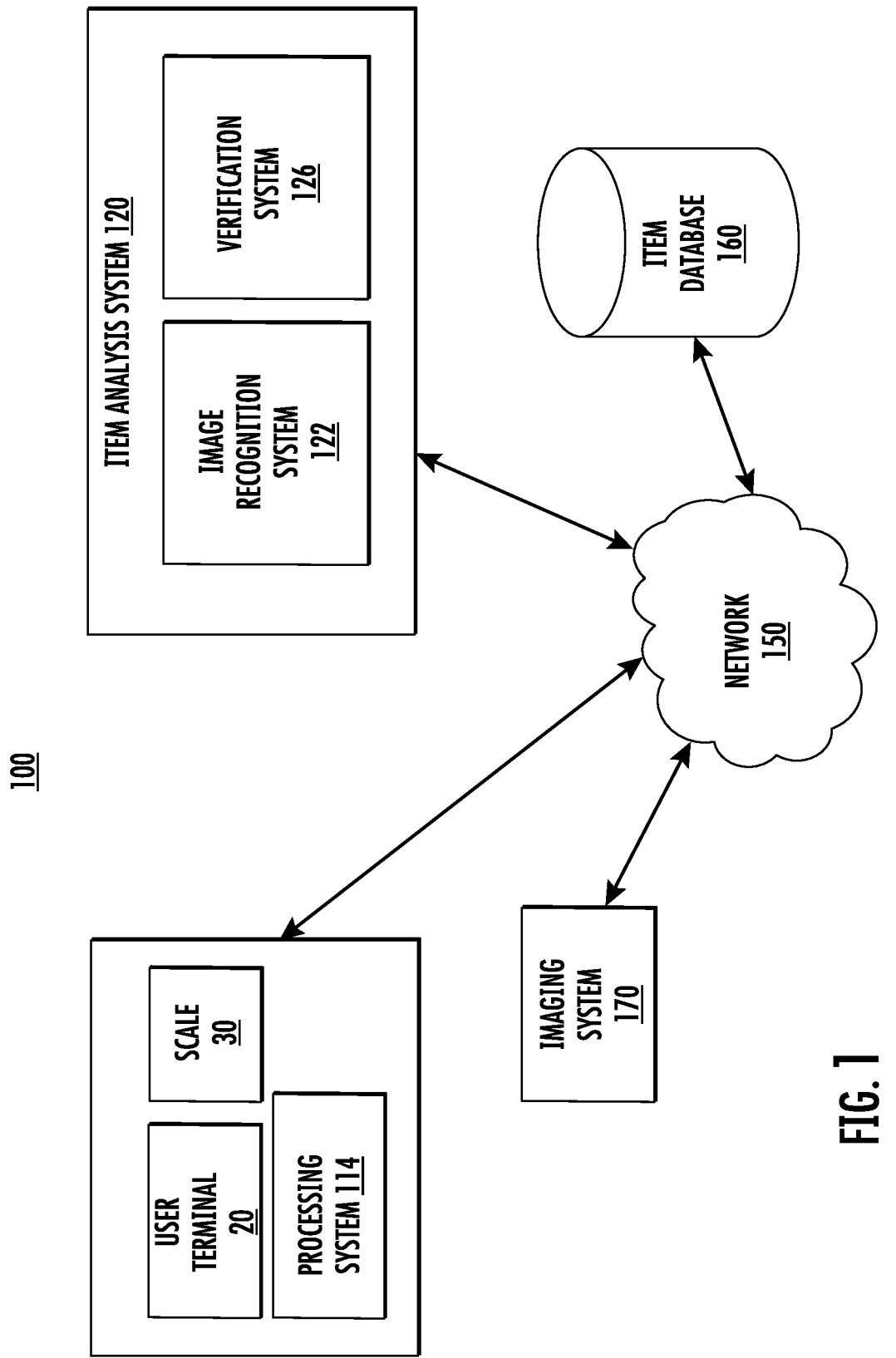
FIG. 1 is a diagram illustrating an example retail environment in accordance with some embodiments of the present disclosure.

FIG. 1 illustrates an embodiment of a retail environment 100 that includes a network 150, a point-of-sale (hereinafter "POS") system 110, an item analysis system 120, an imaging system 170 and an item database 160. To simplify discussion and not to limit the present disclosure, FIG. 1 illustrates only one POS system 110, though multiple may be used, located at the same or different locations. Though the present disclosure generally refers to an environment at a retail location, it will be appreciated that the environment 100 is not limited to retail locations. Rather, the environment 100 can include other types of environments as well, such as office buildings, hospitals, transportation hubs, and so on.

Any of the foregoing components or systems of the environment 100 may communicate via network 150. Although only one network 150 is illustrated, multiple distinct and/or distributed networks may exist. The network 150 can include any type of communication network. For example, the network 150 can include one or more of a wide area network (WAN), a local area network (LAN), a cellular network (e.g., LTE, HSPA, 3G, and other cellular technologies), an ad hoc network, a satellite network, a wired network, a wireless network, and so forth. In some embodiments, the network 150 can include the Internet.

The various components and systems of the environment 100 may be implemented on or include a variety of computing devices, such as processors, distributed processing systems, servers, or isolated execution environments (IEEs) like virtual machines or containers, shared computing resources, or the like. Any of the foregoing components or systems of the environment 100 may be combined and/or may include software, firmware, hardware, or any combination(s) of software, firmware, or hardware suitable for the purposes described.

The POS system 110 facilitates POS transactions via a user terminal 20, scale 30 and processing system 114. POS transactions broadly refer to refer to any part of a process for carrying out a transaction at a retail location, such as on a point-of-sale system or self-checkout station. The specific steps may vary depending upon the retailer or POS system but can include a series of operations executed during the exchange of goods or services, which can include, but are not limited to, the scanning or weighing of items, the entering of item codes, and the finalization of the checkout procedure. The POS system 110 may include or be in communication with hardware and software components, such as displays, scanners, printers, databases, scales, conveyor belts, dimension analyzers, etc. to support the POS transaction. The POS system 110 may include a user terminal 20, such as a touchscreen 22 or keyboard, to allow individuals to interact with the POS system 110 during the POS transaction and a scale 30 for weighing items for purchase. As described herein, a user can interact with the POS system to perform a checkout procedure which includes weighing an item intended for purchase via scale 30. A checkout procedure can refer to the series of steps that a customer follows to complete a purchase. On the other hand, a POS transaction can be considered a subset of the checkout procedure that focuses on the formal actions executed within the POS system.

In accordance with the present disclosure, the item analysis system 120 may be responsible for ensuring the accuracy and integrity of items being weighed and input into the POS system 110 during a POS transaction. This responsibility can include tasks such as identifying when there is incorrect or incomplete data provided for an item during a POS transaction, for example, identifying when an item is improperly weighed or improperly identified by a user, estimating the correct data and/or updating or adjusting the provided data so the final data accurately reflects the items being purchased. For example, the item analysis system 120, can detect that an item was improperly weighed, estimate the proper weight of the item and adjust or modify the improper weight if there is a discrepancy between the estimated proper weight and the improper weight. The item analysis system 120 can include an image recognition system 122 and a verification system 126.

The image recognition system 122 can identify items and produce intended for purchase and additional objects around the checkout station during the POS transaction. The item analysis system 120 receives and analyzes images and image information, the images may be received from image system 170. The images may include a user interacting with the POS system 110, such as, a user weighing an item or produce at a self-checkout station or an employee scanning an item or produce at a traditional checkout station. The image recognition system 122 can identify a plurality of characteristics in the images and/or identify various objects, items or produce in the images. The plurality of characteristics may include, for example, a type of item, a number of items, a number of items in a set or group, a number of items in a container, a container, a type of container, a position of the item with respect to a weighing area or a weighing surface, a weighing area or a weighing surface, a perimeter or boundary of the weighing area or weighing surface, a name of an item, a size of an item, disparate or different items and/or produce being weighed together, unintentional items placed on the weighing surface, obstructions on the weighing surface, etc.

The image recognition system 122 may use computer vision techniques to identify the items, produce and characteristics in the images. To process the image information, the image recognition system 122 can employ a variety of image segmentation and analysis techniques. The system can execute object recognition algorithms to differentiate between different types items, produce, objects, components, equipment, etc. Edge detection algorithms can be utilized to delineate the boundaries between different objects and the background. Color segmentation can be used to distinguish areas based on hue, saturation, and brightness values. Furthermore, the system may employ machine learning models trained on items and produce to optimize the identification process. In some examples, the image recognition system 122 can determine whether a user is purchasing a bag of 8 apples, a carton of 6 apples, 2 heads of lettuce, a rotisserie chicken or 1 pound of burrata.

The verification system 126 can compare information and data from the POS system 110 with the information and data identified by the image recognition system 122. By doing so, the verification system 126 determines if a POS transaction is being performed properly, without issues, mistakes, errors or fraudulent activity. A POS transaction can be considered properly performed if no error conditions or discrepancies are identified by the verification system 126. A POS transaction can be considered properly performed when the information collected by the images matches the information input by the user. An error condition or discrepancy can be indicative of a disruption or error in a POS transaction and can be based on various criteria. The verification system 126 can detect the presence of an error condition based on detecting a discrepancy between the item associated with the POS transaction shown in the images and information input by the user, the information including item weight, an item code or other item identifier. For example, image recognition system 122 may detect an item being weighed for purchase in the images and thus verification system 126 expects an item weight, code or identifier that corresponds to the item being weighed. Yet a user may input a code identifying a different item. Verification system 126 detects the discrepancy between the expected code and the code inputted by the user and recognizes an error condition. For example, image recognition system 122 detects apples being weighed on the scale so verification system 126 expects the code for apples to be input by the user. When the verification system 126 receives a code for bananas, an error condition is detected because there is a discrepancy between the expected code for apples and the code input for bananas. As another example, the verification system 126 can recognize an error condition when there is incomplete placement of items on the designated weighing surface, which could result in inaccurate weight measurements. This detection can occur through a combination of weight sensor feedback and visual analysis, such as using integrated cameras to capture and compare the item's actual placement against the expected dimensions on the weighing surface.

The verification system 126 can analyze a plurality of information and data sets to confirm that a user is properly weighing items or produce for purchase, inputting correct SKUs or barcodes, properly identifying items and produce for purchase and otherwise completing a POS transaction. The information and data sets may be received from POS system 110, image system 170, network 150 or item database 160. In some examples, the verification system 126 recognizes when an item is not positioned within a weighing area resulting in an improper weight measurement. In another example, the verification system 126 can recognize when two disparate items are weighed together. In some examples, the verification system 126 recognizes when a user inputs a produce identity code for bananas while weighing apples which could result in a lower price. The verification system 126 can thus aid in detecting issues, mistakes, errors or fraudulent activity during POS transactions.

The verification system 126 can determine expected weights or expected costs for produce or items that may not be weighed properly or identified properly during the POS transaction to reduce the issues, mistakes, errors or impact of fraudulent activity during the POS transaction. The verification system 126 can detect or estimate a fraction of an item that is within or outside a perimeter of a weighing area and estimate the actual weight of the item. In some examples, the verification system 126 can detect that there is 1 butternut squash being weighed but ⅓ of the butternut squash is resting on an adjacent counter and not on the weighing surface, resulting in an erroneous item weight. The verification system 126 can estimate the weight for the ⅓ of the butternut squash not on the weighing surface. The verification system 126 may estimate the weight by proportionally increasing or decreasing the weight measured by the scale or the verification system may rely on an item database 160 that includes average weights, costs, etc. for the butternut squash. In some examples, the item may be weighed properly but identified by a user incorrectly, resulting in a discrepancy between the input cost and expected cost. Thus, the verification system 126 can detect a discrepancy between images of the item being weighed and the identifying information input into the POS system and update or modify the sales information to reflect the proper item. For example, a user may identify bananas as the produce for purchase when the user is weighing apples, resulting in a lower price. The verification system can determine that a discrepancy exists between the data input into POS system 110 by the user and the data received from image recognition system 122. The verification system 126 can retrieve a cost for the apples from the item database 160 in order to determine the expected cost of the weighed apples and update the sales information accordingly.

The imaging system 170 can capture image data of produce, items or individuals present in environment 100. For example, the imaging system 170 can capture image data associated with a weighing procedure, a weighing system, a scanning system or a scanning procedure performed by a user or employee during a POS transaction. The image data captured during the POS transaction can include a variety of information and characteristics that can be used to determine if the weighing or scanning procedure was performed correctly and if the information and data from the POS system 110 can be considered reliable or includes issues, mistakes, errors or fraud.

The image data can include images of a user or employee placing the item or produce on a scale, weighing the item or produce or inputting data into a user interface. The image data can be used to ensure that the user or employee is following the proper protocol for the weighing and scanning procedures and that the item is being weighed or scanned correctly. The image data can include images of the item itself, including any packaging or labeling. This can be used to confirm that the item being weighed matches the data of the item that was scanned and matches the data of the item identified by image recognition system 122. Additionally, the image data can include images of the tools and equipment used during the weighing and scanning procedure, such as the scale, user interface or display. This can be used to ensure that the equipment is functioning properly and that the measurements being obtained are accurate. Further, the image data can include images of the checkout station and any objects around the checkout station.

The imaging system 170 can be positioned in various locations throughout the environment 100 to capture image data of items, produce, users, employees or the POS system 110. For example, the imaging system 170 can be placed proximate to the POS system 110, to capture images of users weighing, scanning and purchasing items and produce.

The item database 160 can store reference, characteristic or other information for produce and items such as item descriptions, weights, measurements, dimensions, prices or other details. The database 160 can include associations between various types of data, such as, image data, and reference data, to enable more accurate and efficient system operations. For example, when the captured image data can be analyzed in conjunction with stored data and image recognition system 122. This integrated approach leverages multiple data sources to accurately identify items, produce, errors and issues in the images.

The item database 160 can be implemented as cloud storage, such as Amazon Simple Storage Service (S3), Elastic Block Storage (EBS) or CloudWatch, Google Cloud Storage, Microsoft Azure Storage, InfluxDB, etc. The item database 160 can include one or more databases storing data for reference by item analysis system 120, POS system 110 or imaging system 170. The item database 160 can be configured to provide high availability, highly resilient, low loss data storage. The item database 160 can include Amazon CloudWatch metrics and can store multiple copies of the data in the same and different geographic locations and across different types of data stores (for example, solid state, hard drive, tape, etc.).

Figure 2:
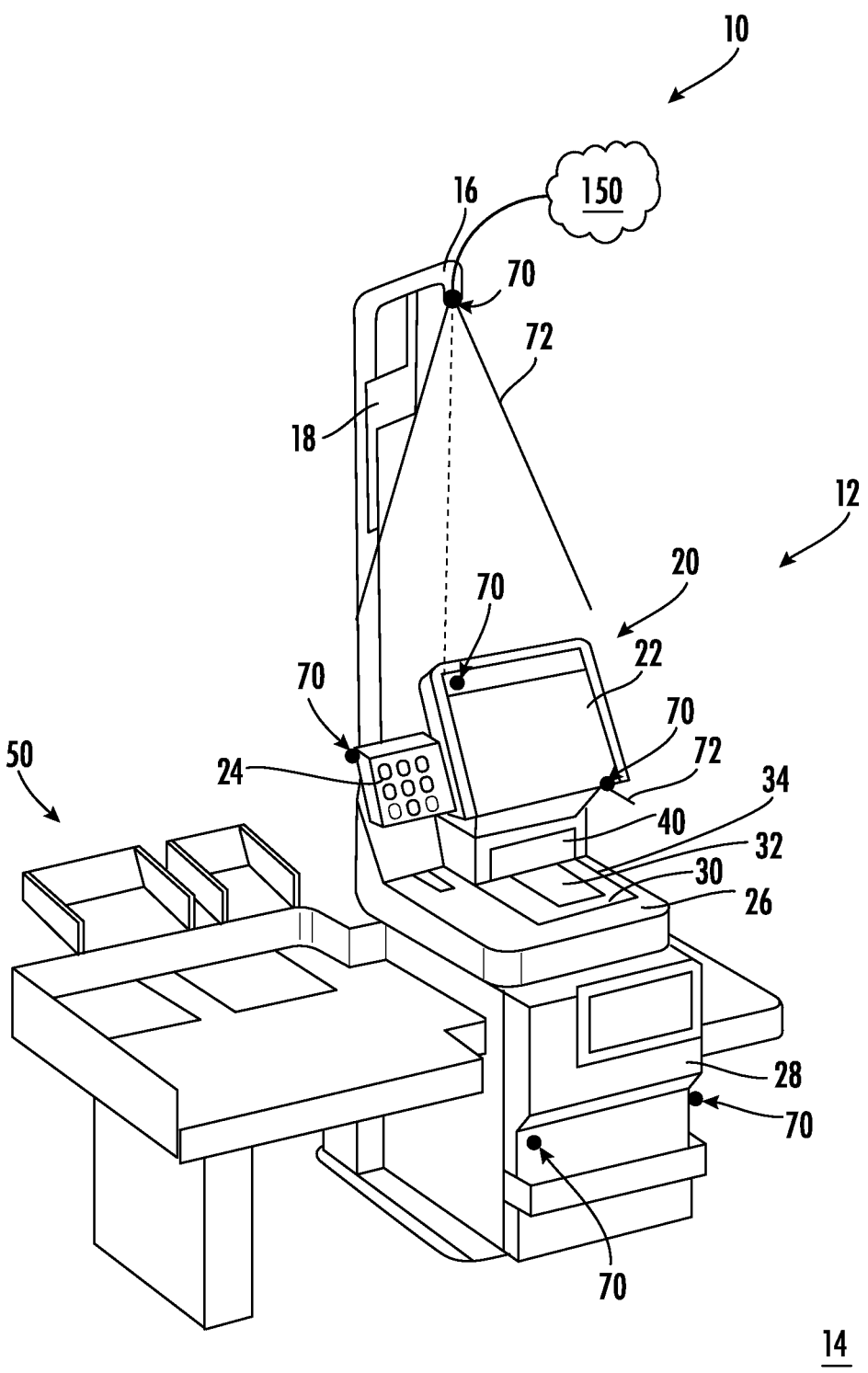
FIG. 2 is a diagram illustrating an example checkout terminal in accordance with some embodiments of the present disclosure.

Referring now to FIG. 2, a point-of-sale system 10 for a self-checkout station 12 in accordance with some embodiments of the present disclosure is illustrated. The point-of-sale system 10 includes a self-checkout station 12 at a first location 14. Checkout station 12 includes a terminal 20 and a bagging station 50. The terminal 20 may include a customer interface, for example, a touchscreen 22, a payment console 24, counter 26 and base or housing 28. The checkout station 12 may also include an indicator, for example, a pole 16 with a light 18 attached thereto, to indicate, for example, when a checkout station is open or closed and/or when a consumer needs the assistance of a store employee. Checkout stations, including both self-checkout stations and manned checkout stations, at retail and grocery stores are typically installed in groups or clusters with a number of checkout stations being located in the same area or vicinity. The point-of-sale system 10 may be an embodiment of, or include one or more components of, the POS system 110 of FIG. 1.

It will be understood that the configuration illustrated in FIG. 2 is provided as an example only and that embodiments of the present disclosure are not limited thereto. In addition, checkout stations may include traditional or manned checkout stations and mobile, pop-up or portable checkout stations.

Figure 3:
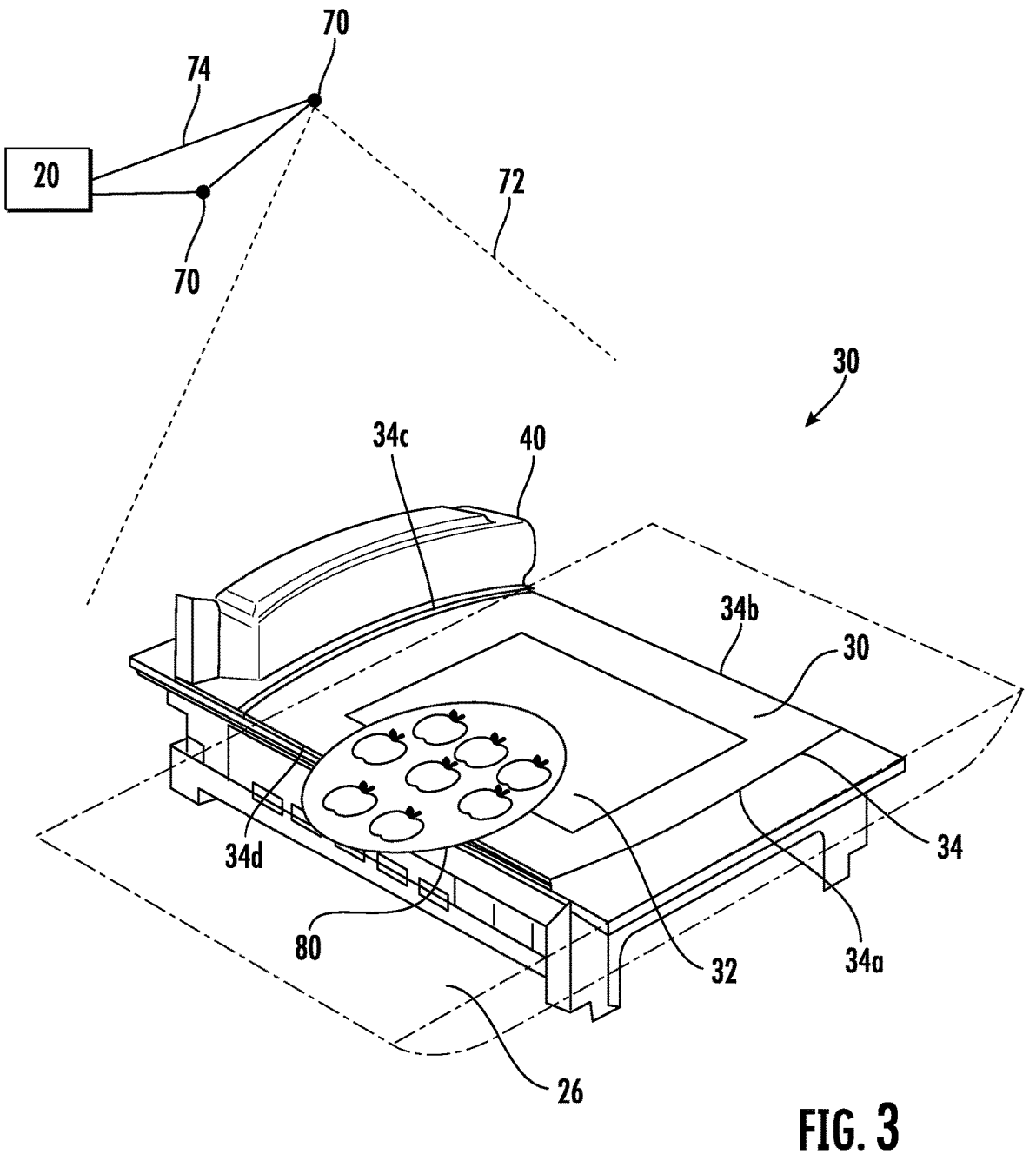
FIGS. 3 through 5 are diagrams illustrating an example weighing platter in accordance with some embodiments of the present disclosure.

The terminal 20 includes a scanner 40 adjacent a scale 30. The scale 30 includes a weighing platter 32 having a perimeter 34. The scale 30 is placed within an opening of counter 26 such that counter 26 surrounds a part of the perimeter 34 of scale 30. In other embodiments, the counter may be adjacent to one or more peripheral edges of the scale. As shown in FIG. 3, the perimeter 34 includes peripheral edges 34*a*, 34*b*, 34*c*, 34*d*. The shape of the scale perimeter may vary. An object, including items and produce, is weighed by placing the object on the weighing platter 32 such that the total weight of the object is transferred to the weighing platter within perimeter 34 which defines the weighing area of the scale 30. A first object may not be weighed properly when the first object contacts a second object or another surface aside from weighing platter 32 because a portion of the weight for the first object may be transferred to the second object or surface. Consequently, the weighing platter does not receive the full weight of the first object which results in an inaccurate weight measurement.

Checkout station 12 includes at least one edge camera 70 which may be connected to network 150, imaging system 170 or item analysis system 120. Each edge camera 70 has a corresponding field of view (FOV) 72 associated therewith which may include a desired target area. The edge cameras 70 may be arranged such that the FOVs 72 overlap one another and/or form a complete view of checkout station 12.

Edge cameras 70 may also be arranged so the FOV 72 is on a desired target area, for example, a focus on scale 30, an overhead view of terminal 20, bagging area 50, payment console 24, etc.

Each checkout station generally includes numerous fixed cameras installed thereon. The cameras may be positioned to provide viewing angles of desired target areas. The target areas may include, for example, the scanner and weighing platter, the cart or hand basket, the bottom of the basket, the bagging area and the payment area. The target areas may encompass the entire store and may include overlapping areas and fields of view. Cameras installed on checkout stations next to or near the primary station may provide an alternate viewing angle that may be of value as an input to the primary station, particularly for self-checkout stations. The cameras may be smart cameras and/or edge cameras and may be connected to one another and/or to additional nodes forming a vision mesh network.

Edge cameras 70 may execute item analysis system 120 and imaging system 170. Each edge camera 70 is connected to at least one other node or edge camera forming a vision mesh network 74. In some examples, each edge camera 70 in checkout station 12 is directly connected to other cameras 70 and to network 150. Each edge camera 70 may be connected to any number of other edge cameras 70 as desired. The edge cameras 70 are connected to one another in a wired or wireless manner or any combination thereof. Using a wired setup may reduce latency and interference.

Each of the edge cameras 70 can includes item analysis system 120 and imaging system 170 and thus collect and process information and perform calculations on the edge camera 70, including analyzing images and other data, near the source of the data, i.e., at the edge camera 70. Edge computing reduces the likelihood for the need to send images and other data to a central server or cloud service for processing which may increase processing speed and reduce stress on the overall network.

The edge cameras 70 capture and feed data inputs, for example, images or video capture, and process the data inputs via computer vision modules which may include produce recognition modules, known average weight modules and face and body recognition modules which outputs operational determinations based on the inputted data. The accuracy is directly linked to the quality and quantity of input data. Computer vision modules include methods for acquiring, processing, analyzing and understanding digital images, and extraction of high-dimensional data from the real world in order to form decisions. The various embodiments of computer vision modules discussed herein acquire, process, analyze and understand images and data and provide feedback and operational determinations regarding a point-of-sale transaction.

In accordance with the present disclosure, a customer may initiate a transaction by pressing a "start" button or entering a loyalty number on touchscreen 22. The scanner 40 may be used to scan items which are then placed in bagging area 50. The touchscreen 22 may be used to look up items that need to be weighed, for example, produce such as bananas or apples, which are weighed on the scale 30 then placed in bagging area 50. Alternatively, the customer may input an item identification code via touchscreen 22. The item identification code may be located on a label, barcode or sticker on the item.

Figure 4:
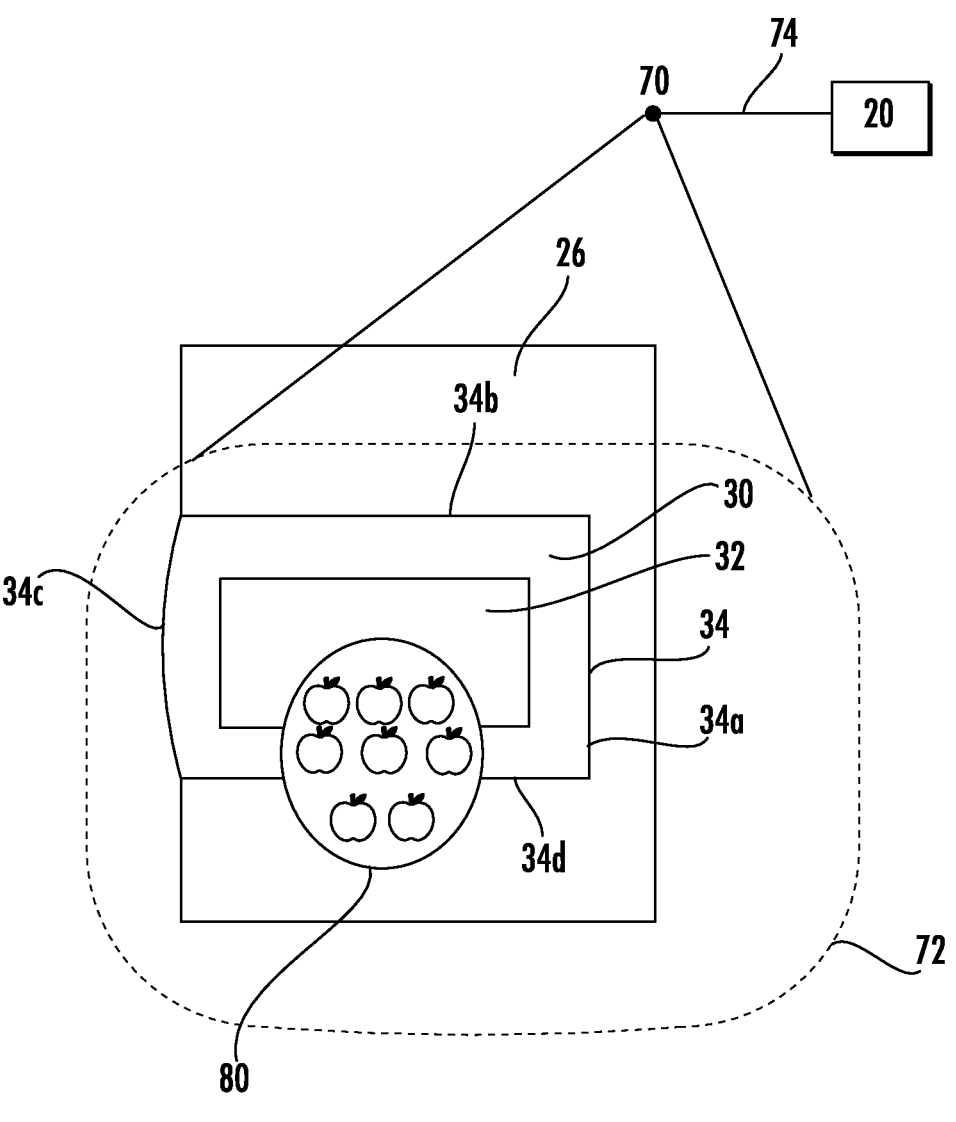
Figure 5:
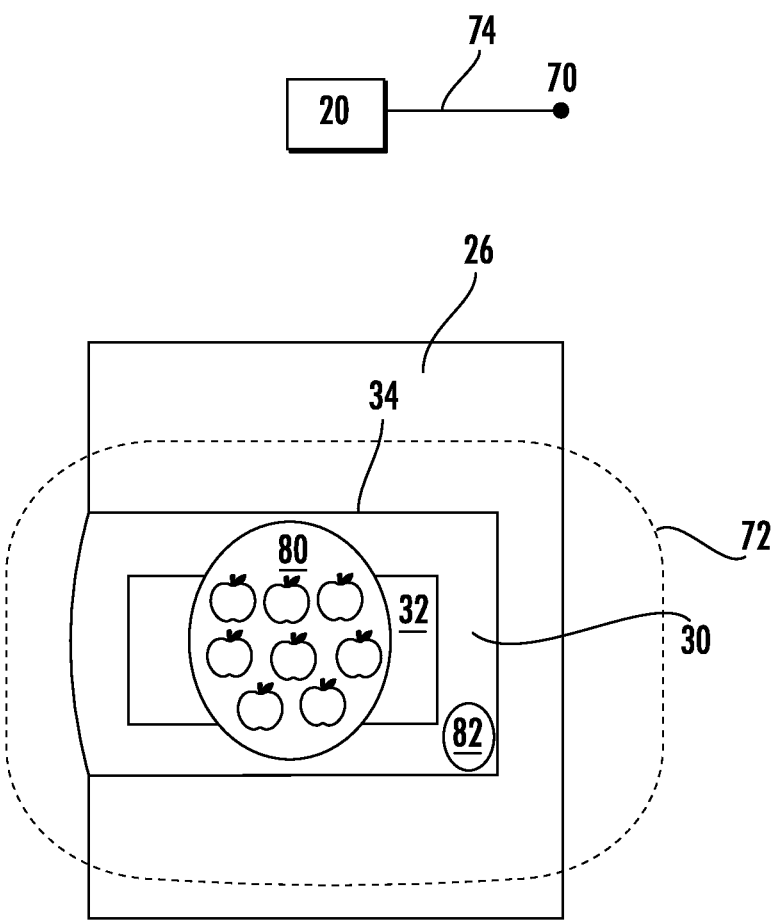

The cost of items purchased by weight rely on each item being weighed accurately. Generally, an item 80 is properly weighed by the scale 30 when the item 80 alone is placed on the weighing platter 32 and the item 80 is within the perimeter 34 of the scale 30 so the full weight of the item is transferred to the weighing platter 32 as illustrated in FIG. 5. Items 80 may not be weighed properly when the item 80 extends across perimeter 34, as illustrated in FIGS. 3 and 4, because a portion of the item's weight is transferred to another surface and is not able to be measured by scale 30. As shown, item 80 is resting partially on counter 26. In addition, items may not be weighed properly when additional items are mistakenly placed on the scale. For example, a handbag, a child's toy or a bottle of water 82 (FIG. 5) may be accidentally placed on the scale by the customer, inadvertently affecting the weight of the desired item.

In accordance with the present disclosure, item analysis system 120 and imaging system 170 can determine if an item 80 placed on scale 30 is weighed properly. Item analysis system 120, imaging system 170, and cameras 70 can capture and process images and data to determine if the item 80 is placed on the scale 30 such that full weight of item 80 is on weighing platter 32 or if the item 80 rests on another surface or object, for example by extending over the perimeter 34 or any of the peripheral edges 34a, 34b, 34c, 34d. Item analysis system 120 and imaging system 170 can also detect if an additional item 82 is accidentally placed on the scale thereby impacting the weight of the desired item as shown in FIG. 5

As illustrated in FIGS. 3 and 4, when using a self-checkout station 12 at a grocery store, a customer has placed an item 80 on weighing platter 32 of the scale 30. The item 80 is a bag including eight apples, however, six apples are positioned on the weighing platter 32, the remaining two apples are resting on counter 26. Consequently, the scale 30 cannot measure the weight for the whole item 80 (eight apples) and instead measures the weight for the part of item 80 (six apples) on weighing platter 32. Thus, without intervention, the customer will be charged for six apples when eight apples were intended to be purchased.

In accordance with the present disclosure, an edge camera 70 with a FOV 72 of scale 30 embodying and executing the item analysis system 120 and imaging system 170 recognizes that a partial or incomplete amount of item 80 is being weighed. As shown in FIGS. 1, 2 and 3, cameras 70 have views of weighing platter 32 and perimeter 34. Camera 70 recognizes that item 80 extends across the perimeter 34 of weighing platter 32. Camera 70 acquires data inputs, for example, images or video capture, and processes the data inputs via computer vision modules which output operational determinations based on the inputted data. For example, the computer vision module may send an instruction to user interface 22 informing the customer that a weighing error has occurred and giving the customer an opportunity to ameliorate the error. As illustrated in FIG. 5, the item 80 is placed on weighing platter 32 within the perimeter 34 of scale 30 for weighing. Edge camera 70 can detect and recognize when the item 80 is being properly weighed and provides this information to user terminal 20.

In some examples, a plurality of cameras 70 on checkout station 12 include views of scale 30. When this occurs, one camera may be the designated primary camera and receive inputs from the remaining secondary cameras. The primary camera processes the inputs from all the cameras and communicates with user terminal 20 regarding scale 30.

In accordance with some embodiments of the present disclosure, a combination of image information and known average weights and costs may be used to account for the weight or cost of all items, even if some items or part of an item are off the scale. Item analysis system 120 recognizes when an item 80 is improperly weighed because the item 80 is not on the scale or partially off the scale. For example, item analysis system 120 recognizes that six of eight apples are weighed, such that two apples are missing from the cost calculation. Item analysis system 120 can send an instruction to terminal 20 to charge the customer for two additional apples. The charge may be based on, for example, known average weights or by estimating or extrapolating the weight from the portion of the item that was weighed. If apples are known to weigh, on average, 0.25 lbs each, the customer may be charged an additional 0.5 lbs for the two apples outside perimeter 34 on scale 30. Alternatively, if the six apples weighed by the customer weighed a total of 1.2 lbs, the customer could be charged an additional 0.4 lbs for the two apples not on the scale. Thus, the item analysis system 120, POS system 110 and imaging system 170 identify and recognize errors during checkout thereby reducing shrinkage and fraudulent activity.

In some examples, the item analysis system 120 can determine when a discrepancy exists between an item that is not properly identified by the customer using information from mesh network 74, imaging system 170 and known average weights stored in item database 160. A customer may place an item 80 on a scale that includes eight apples yet enter an item identification code for bananas into touchscreen 22 which would traditionally result in a lower price because bananas are less expensive than apples. Item analysis system 120 determines that the item 80 on the scale 30 includes apples and confirms that the weight of item 80 corresponds with the known average weights for apples. A message may be displayed on touchscreen 22 to inform the customer of the error or the item analysis system 120 may modify or adjust the sales information accordingly. The message may request customer input, the customer may be asked to confirm apples are on the scale 30 and not, for example, bananas. Thus, the item analysis system 120 can recognize discrepancies regarding item identification as well as errors during weighing. In at least one embodiment, the user interface 22 may generate suggestions for the item identification based on the images recognized by camera 70. In at least one embodiment, the user interface 22 may generate suggestions for the item identification based on the images recognized by camera 70. Thus, the item analysis system 120 identifies items being purchased via images, computer vision and image recognition to predict the items being purchased. The item analysis system 120 can then compare the predicted items to information input by customers or received by terminal 20.

In accordance with some embodiments of the present disclosure, item analysis system 120 can detect if two disparate items are placed on scale 30 for weighing. As illustrated in FIG. 5, a customer places item 80, a bag of apples, on weighing platter 32 within the perimeter 34 of the scale, however, a water bottle 82 is mistakenly placed on the scale 30 as well. Item analysis system 120 detects and recognizes that two disparate items are being weighed at the same time and communicates this to POS system 110 such that the user interface 22 may display an error alerting the customer that two different items 80, 82 are on the scale 30 together and/or request customer input.

FIG. 6 is a flow diagram illustrative of an embodiment of a routine 300 implemented by a computing device of the environment 100. Although described as being implemented by the item analysis system 120, it will be understood that the elements outlined for routine 300 can be implemented by one or more computing devices/components that are associated with the environment 100, such as, but not limited to, POS system 110, checkout terminal 20, edge camera 70, user interface 22, processing system 114, or scale 30, etc. Thus, the following illustrative embodiment should not be construed as limiting. Furthermore, fewer, more, or different blocks can be used as part of the routine 300 and the blocks may be performed in different order than shown.

At block 310, the item analysis system 120 receives image information corresponding to a POS transaction from imaging system 170. The image information may include images of a user and/or objects during a POS transaction including images of a user scanning or weighing objects, items or produce for purchase. With reference to FIGS. 2 to 5, the image information may include images of the checkout terminal 20, scale 30, scanner 40, user, point-of-sale system 10. The image information may include information showing that an item was not positioned for accurate weighing on scale 30. For example, the image information may include images showing the position of items with respect to the perimeter 34 of weighing platter 32.

At block 320, the item analysis system 120 receives an item weight or an item cost for the item associated with the POS transaction. The item analysis system 120 may receive an item weight or item cost from point-of-sale system 110 or item database 160. With reference to FIGS. 2 to 5, the item weight or item cost may be based on information input into scale 30 or scanner 40. In some examples, a user places an item on scale 30 and enters an item code into user interface 22. The scale 30 records a weight for the item and the POS system 110 sends the item weight and item code to item analysis system 120.

At block 330, the item analysis system 120 determines an expected item weight or an expected item cost for the item based on the image information. The received image information can be forwarded to a processing unit within the item analysis system 120 for further analysis to determine an expected item weight or an expected item cost. The image information can be processed using various algorithms and techniques, including but not limited to computer vision algorithms, object detection, and image segmentation, to isolate features relevant to determining an expected item weight or expected item cost for an item associated with a point-of-sale transaction. Images are captured and processed to determine whether if the checkout procedure is being performed properly. Specifically, images may be processed to determine if items are weighed properly on the scale, if items are scanned properly or if items are input into the user interface properly. The number of items on the scale, the type or identity of items on the scale and the position of items with respect to the scale are some of the details considered. The expected weight or expected cost of an item can be determined by retrieving weight information or cost information from item database 160 or network 150 corresponding to the identified items. In some examples, eight apples are identified in images of the weighing area, so an expected item weight and expected item cost for eight apples will be determined. The determination may include accessing item database 160 to determine how much apples weigh and how much apples cost. The expected weight and expected cost for eight apples can then be calculated using information from item database 160.

At block 350, item analysis system 120 can manage a POS transaction in response to the error condition or discrepancy. The item analysis system 120 can modify a total item weight or a total item cost in response to the discrepancy in order to correct the error condition. Thus, a user's sales list may automatically reflect the appropriate charge for the item or produce being purchased. In the previous example, the user will be charged for the full bag 80 including eight apples instead of being charged for the six apples weighed by scale 30. In this regard, the amount of loss or shrinkage can be reduced. In another example, if a user intentionally or mistakenly inputs the code the for bananas when weighing apples, the item analysis system 120 can change the code input by the user for bananas to the code for apples, when the item analysis system 120 determines from the image information that apples, and not bananas, are being purchased in order to provide an accurate total item cost.

For example, consider a scenario in which a user places a bag 80 of apples on scale 30 as shown in FIGS. 3 and 4. The bag 80 may be arranged such that the bag 80 extends beyond a weighing platter of 32 of scale 30. The item analysis system 120 can detect, through image information, that bag 80 is not being weighed accurately because of a portion of the bag 80 extends beyond perimeter 34 and onto counter 26. In response, item analysis system 120 can determine an expected weight or expected cost of the whole bag 80 of apples based on the images received. Thus, in this example, the expected weight or expected cost of the item will not be the same as the received item weight or the received item cost because only a portion of the apples in bag 80 were weighed and the determined expected item weight or expected item cost is higher because the estimate is for the entire bag 80 of apples. Accordingly, at block 340, the item analysis system 120 can determine that a discrepancy exists between the item weight and the expected item weight or between the item cost and the expected item cost. A discrepancy exists when the expected item weight or expected item cost is different from the item weight or item cost. Once the item analysis system 120 identifies a discrepancy exists, the item analysis system 120 can manage the POS transaction accordingly. The POS transaction may update the weight or cost of the item or change an item code or item identifier or request user input or employee intervention. The item analysis system 120 can be programmed to perform other actions such as generating and/or sending a message in response to the discrepancy which may be shown to a user via POS system 110 and/or user interface 22, generating and/or sending an alert to a store employee and/or POS system 110 and/or communicating with item database 160.

Figure 7:
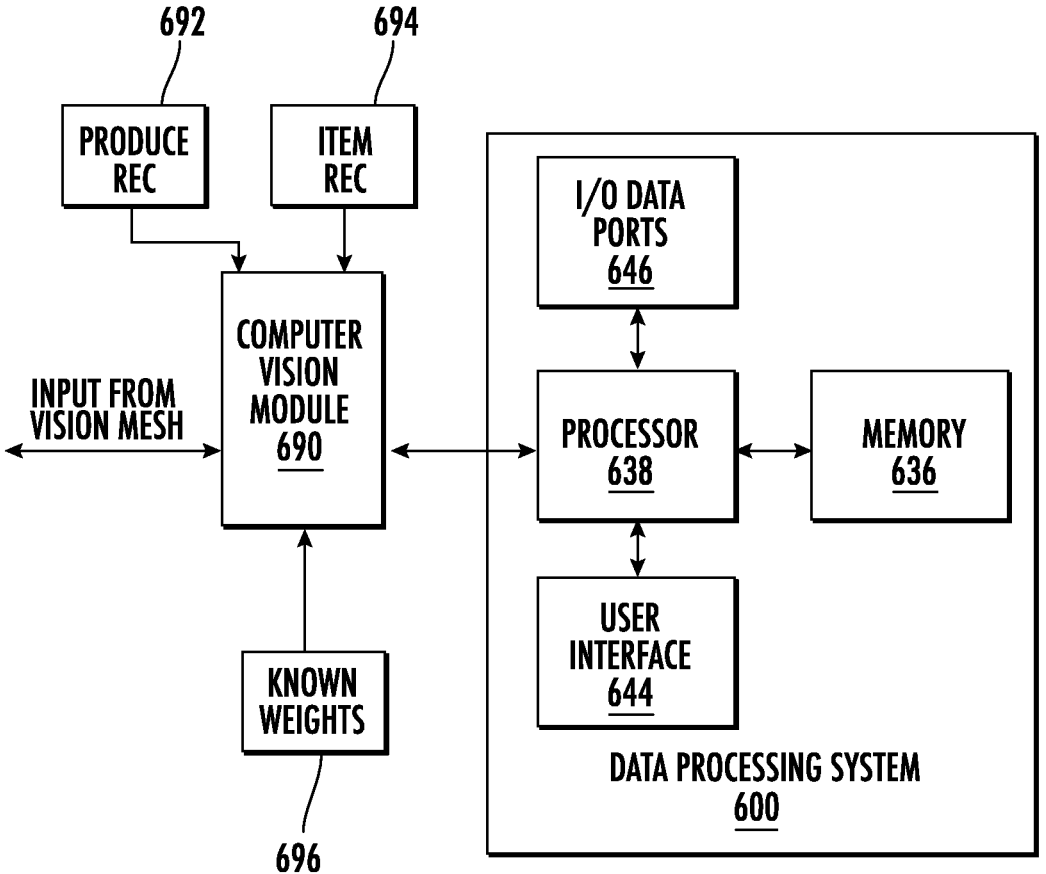
FIG. 7 is a basic block diagram of a data processor that can be used to process data in accordance with some embodiments of the present disclosure.

Referring now to FIG. 7, a data processor 600 in communication with an item module 690 receives image inputs from the vision mesh 74 (FIGS. 2 to 5) will be discussed. It will be understood that the data processor may be included in any component of the system without departing from the scope of the present disclosure. For example, the data processor may be present in the point-of-sale system 10 (FIG. 2) or may be centrally located. The item module 690 may increase the likelihood that the point-of-sale data is accurate, for example, that all items are properly weighed and scanned, and items are not missed or stolen, or that each item entered includes the proper corresponding stock-keeping unit (SKU).

As illustrated, FIG. 7 is a block diagram of an example of a data processing system 600 suitable for use in the systems in accordance with embodiments of the present disclosure. The data processing may take place in any of the devices in the system (or all of the devices, for example, in each edge camera 70 (FIGS. 2 to 4)), checkout terminal 20 or POS system, without departing from the scope of the present disclosure. As illustrated in FIG. 7, the data processing system 600 includes a user interface 644 such as a keyboard, keypad, touchpad, voice activation circuit or the like, I/O data ports 646 and a memory 636 that communicates with a processor 638. The I/O data ports 646 can be used to transfer information between the data processing system 600 and another computer system or a network. These components may be conventional components, such as those used in many conventional data processing systems, which may be configured to operate as described herein. An item module 690 which may include produce recognition module 692 and item recognition module 694 processes image inputs from mesh network 74 and communicates with mesh network 74 and data processing system 600. The item module may also include a known average weights module 696 to assist in processing inputs from mesh network 74.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Furthermore, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Furthermore, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

A method is provided. The method includes:

receiving image information corresponding to a point-of-sale (POS) transaction, the image information comprising an item being weighed, the item associated with the POS transaction;

receiving an indication of an item weight or an indication of an item identifier for the item associated with the POS transaction;

determining an expected item weight or an expected item identifier for the item based on the image information;

determining a condition exists between an item weight and the expected item weight or between an item identifier and the expected item identifier; and managing the POS transaction based on the condition.

The method may also include, taken alone or in combination:

detecting a position of the item with respect to a weighing area based on the image information;

estimating a fraction of the item that is outside the weighing area based on the image information;

identifying one or more item identifiers for the item based on the image information;

communicating the condition to a user during the POS transaction;

wherein the one or more item identifiers includes a position of the item during weighing with respect to a weighing area;

wherein determining the expected item weight or the expected item identifier comprises detecting if the position of the item is outside the weighing area;

wherein determining the expected item weight or the expected item identifier comprises estimating a fraction of the item that is outside the weighing area;

wherein determining the expected item weight or the expected item identifier comprises estimating the expected item weight or the expected item identifier based on the item weight or the item identifier and a fraction of the item inside the weighing area;

wherein managing the POS transaction includes using the estimated expected weight or estimated expected item identifier;

wherein managing the POS transaction includes using the expected weight or estimated expected item identifier;

wherein determining the expected item weight or the expected item identifier comprises referencing a table of weights or costs;

wherein determining the expected item weight or the expected item identifier comprises the item weight or the item identifier and a table of weights or costs;

wherein determining the expected item weight or the expected item identifier comprises a table of weights or costs and a position of the item with respect to a weighing area;

wherein determining the expected item weight or the expected item cost comprises estimating a fraction of the item outside a weighing area and a table of weights or costs;

wherein managing the point-of-sale (POS) transaction comprises referencing a table of average weights or costs;

wherein the one or more of item identifiers can be used to detect if two disparate items are being weighed together;

wherein the plurality of item identifiers includes a type of item, a number of items in a set, a number of items in a container, a position of the item with respect to a weighing area, a name of an item or a size of an item.

A point-of-sale system is provided. The point-of-sale system includes:

one or more processors configured to:

receive image information corresponding to a point-of-sale (POS) transaction, the image information comprising an item being weighed, the item associated with the POS transaction;

receive an indication of an item weight or an indication of an item identifier for the item associated with the POS transaction;

determine an expected item weight or an expected item identifier for the item based on the image information;

determine a condition exists between an item weight and the expected item weight or between an item identifier and the expected item identifier; and manage the POS transaction based on the condition.

A non-transitory computer-readable medium (CRM) is provided. The CRM stores computer executable instructions that when executed by one or more processors cause the one or more processors to:

receive image information corresponding to a point-of-sale (POS) transaction, the image information comprising an item being weighed, the item associated with the POS transaction;

receive an indication of an item weight or an indication of an item identifier for the item associated with the POS transaction;

determine an expected item weight or an expected item identifier for the item based on the image information;

determine a condition exists between an item weight and the expected item weight or between an item identifier and the expected item identifier; and manage the POS transaction based on the condition.

A method is provided. The method includes:

receiving image information corresponding to a POS transaction, the image information comprising an item associated with the POS transaction;

receiving at least one identification characteristic for a trait of the item associated with the POS transaction;

identifying at least one image characteristic corresponding to the trait of the item associated with the POS transaction based on the image information; and verifying the at least one identification characteristic corresponds to the at least one image characteristic.

A method is provided. The method comprises:

receiving first information corresponding to an item weighing procedure as part of a point-of-sale (POS) transaction, the first information comprising at least one of image data, weight metrics, or an item identifier;

identifying a presence of an error condition associated with the item weighing procedure based at least in part on the first information, wherein the error condition is indicative of at least one of a discrepancy between a measured item weight and an expected item weight, or a discrepancy between the item identifier and an expected item identifier; and managing results of the POS transaction based at least in part on at least one of the expected item identifier or the expected item weight.

Exemplary embodiments of the present disclosure are described in detail with reference to the accompanying drawings. The disclosure may, however, be exemplified in many different forms and should not be construed as being limited to the specific exemplary embodiments set forth herein. Rather, these exemplary embodiments are provided so that this disclosure will be thorough and complete, and will fully convey the scope of the disclosure to those skilled in the art.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

In the present disclosure, reference is made to a "Point-Of-Sale (POS) system." The term "POS system" refers to any system that is used to process transactions at a retail store or other business, including self-checkout (SCO) systems where individuals can scan, pay for, or bag their own items. POS systems are used for a variety of purposes, such as completing sales transactions, processing returns, or handling inquiries. POS systems can be found in a variety of settings, including traditional brick-and-mortar retail stores, online stores, and mobile sales environments. It will be understood that as used herein POS systems include more than one checkout system adjacent to or near other like systems having cameras associated therewith.

As used herein, an "edge camera" refers to a camera that generally features onboard storage. An edge camera may be used as a security camera that saves recorded video footage data onto the internal storage hardware. Thus, recording at the edge is the recording of video and storing it either in camera or to a directly connected storage device instead of transporting it across the network to a centralized recording facility such as a digital video recorder.

As used herein, a "vision mesh network" refers to at least one camera connected to another camera or node via a network, for example, a network including Wi-Fi routers, that act as a single network of cameras. There may be multiple sources of data instead of a single camera.

As used herein, computer vision modules include methods for acquiring, processing, analyzing and understanding digital images, and extraction of high-dimensional data from the real world in order to form decisions. The various embodiments of computer vision modules discussed herein acquire, process, analyze and understand images and data from the vision mesh network and provide feedback and operational decisions regarding a customer, POS system, POS transaction checkout procedure and/or checkout station.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including", "have" and/or "having" when used herein, specify the presence of stated features, integers, steps, operations, elements, and/or components, but do not preclude the presence or addition of one or more other features, integers, steps, operations, elements, components, and/or groups thereof. Elements described as being "to" perform functions, acts and/or operations may be configured to or other structured to do so. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which various embodiments described herein belong. It will be further understood that terms used herein should be interpreted as having a meaning that is consistent with their meaning in the context of this specification and the relevant art and will not be interpreted in an idealized or overly formal sense unless expressly so defined herein.

While the foregoing is directed to aspects of the present disclosure, other and further embodiments of the disclosure may be devised without departing from the basic scope thereof, and the scope thereof is determined by the claims that follow.

What is claimed is:

1. A method operating in an image recognition system including an image recognition device having a sensor configured to capture a field-of-view of a target area associated with a Point-of-sale (POS) system and an image analysis module in communication with a network, the method comprising:

identifying an item in the field-of-view of the target area associated with the POS system during a POS transaction;

determining, by the image analysis module of the image recognition device, image information associated with the item in the target area, wherein the image information comprises image data inputs of the item in the target area extrapolated and processed via a computer vision module coupled to the POS system during the POS transaction;

receiving, from a scale coupled to the POS and positioned in the field-of-view of the target area, an indication of an item weight for the item identified in the target area;

receiving, from the image recognition device coupled to the POS, the image data inputs of the item in the target area;

receiving, from an item database in communication with the network, an indication of an expected item identifier and expected weight of the item in the target area;

determining a match between the expected item weight, the expected item identifier for the item in the target area, and the image data inputs received from the image recognition device and the item weight received from the scale of the item in the target area during the POS transaction;

determining a condition discrepancy associated with the POS system during the POS transaction, wherein the condition discrepancy comprises determining that the expected item weight, the expected item identifier of the item in the target area and the image data inputs received from the image recognition device and the item weight received from the scale do not match; and responsive to determining the condition discrepancy associated with the POS system during the POS transaction, causing an error correction operation to execute at the POS system during the POS transaction by automatically preventing completion of the POS transaction until a verification input is received at a user interface of the POS terminal receiving image information corresponding to a point-of-sale (POS) transaction, the image information comprising an item being weighed, the item associated with the POS transaction;

receiving an indication of an item weight or an indication of an item identifier for the item associated with the POS transaction;

determining an expected item weight or an expected item identifier for the item based on the image information;

determining a condition exists between an item weight and the expected item weight or between an item identifier and the expected item identifier; and managing the POS transaction based on the condition.

2. A point-of-sale system including an image recognition device having a sensor configured to capture a field-of-view of a target area associated with a Point-of-sale (POS) system and an image analysis module in communication with a network, the system comprising:

one or more processors configured to:

identify an item in the field-of-view of the target area associated with the POS system during a POS transaction;

determine, by the image analysis module of the image recognition device, image information associated with the item in the target area, wherein the image information comprises image data inputs of the item in the target area extrapolated and processed via a computer vision module coupled to the POS system during the POS transaction;

receive, from a scale coupled to the POS and positioned in the field-of-view of the target area, an indication of an item weight for the item identified in the target area;

receive, from the image recognition device coupled to the POS, the image data inputs of the item in the target area;

receive, from an item database in communication with the network, an indication of an expected item identifier and expected weight of the item in the target area;

determine a match between the expected item weight, the expected item identifier for the item in the target area, and the image data inputs received from the image recognition device and the item weight received from the scale of the item in the target area during the POS transaction;

determine a condition discrepancy associated with the POS system during the POS transaction, wherein the condition discrepancy comprises determining that the expected item weight, the expected item identifier of the item in the target area and the image data inputs received from the image recognition device and the item weight received from the scale do not match; and responsive to determining the condition discrepancy associated with the POS system during the POS transaction, cause an error correction operation to execute at the POS system during the POS transaction by automatically preventing completion of the POS transaction until a verification input is received at a user interface of the POS terminal.

3. A non-transitory computer-readable medium in a system including an image recognition device having a sensor configured to capture a field-of-view of a target area associated with a Point-of-sale (POS) system and an image analysis module in communication with a network and storing computer executable instructions that when executed by one or more processors cause the one or more processors to:

identify an item in the field-of-view of the target area associated with the POS system during a POS transaction;

determine, by the image analysis module of the image recognition device, image information associated with the item in the target area, wherein the image information comprises image data inputs of the item in the target area extrapolated and processed via a computer vision module coupled to the POS system during the POS transaction;

receive, from a scale coupled to the POS and positioned in the field-of-view of the target area, an indication of an item weight for the item identified in the target area;

receive, from the image recognition device coupled to the POS, the image data inputs of the item in the target area;

receive, from an item database in communication with the network, an indication of an expected item identifier and expected weight of the item in the target area;

determine a match between the expected item weight, the expected item identifier for the item in the target area, and the image data inputs received from the image recognition device and the item weight received from the scale of the item in the target area during the POS transaction;

determine a condition discrepancy associated with the POS system during the POS transaction, wherein the condition discrepancy comprises determining that the expected item weight, the expected item identifier of the item in the target area and the image data inputs received from the image recognition device and the item weight received from the scale do not match; and responsive to determining the condition discrepancy associated with the POS system during the POS transaction, cause an error correction operation to execute at the POS system during the POS transaction by automatically preventing completion of the POS transaction until a verification input is received at a user interface of the POS terminal.

4. The method of claim 1, further comprising identifying a plurality of characteristics associated with the item in the field of view, the plurality of characteristics comprising one or more of a type of item, a number of items, a number of items in a set or group, a number of items in a container, a container, a type of container, a position of the item with respect to a weighing area or a weighing surface, a weighing area or a weighing surface, a perimeter or boundary of a weighing area or weighing surface, a name of an item, a size of an item, disparate or different items and/or produce being weighed together, unintentional items placed on the weighing surface and obstructions on the weighing surface.

5. The method of claim 1, wherein determining a condition discrepancy associated with the POS system during the POS transaction comprises determining the condition discrepancy using one of object recognition algorithms to differentiate between different types of items, produce, objects, components and equipment; edge detection algorithms to delineate boundaries between different objects and a background; color segmentation to distinguish areas based on hue, saturation, and brightness values; and machine learning models trained on items and produce to optimize an identification process.

6. The method of claim 1, wherein the condition discrepancy comprises recognition that two different items were weighed together, an item not positioned on scale properly, an improper identification code and/or detecting a fraction of an item that is outside the scale.

7. The method of claim 1, wherein the item database includes item descriptions, weights, measurements, dimensions and/or prices.

8. The method of claim 7, wherein the item database further includes associations between various types of data and wherein the types of data include image data and reference data.

9. The point-of-sale system of claim 2, wherein the one or more processors are further configured to identify a plurality of characteristics associated with the item in the field of view, wherein the plurality of characteristics comprise one or more of a type of item, a number of items, a number of items in a set or group, a number of items in a container, a container, a type of container, a position of the item with respect to a weighing area or a weighing surface, a weighing area or a weighing surface, a perimeter or boundary of a weighing area or weighing surface, a name of an item, a size of an item, disparate or different items and/or produce being weighed together, unintentional items placed on the weighing surface and obstructions on the weighing surface.

10. The point-of-sale system of claim 2, wherein the one or more processors are further configured to determine the condition discrepancy using one of object recognition algorithms to differentiate between different types of items, produce, objects, components and equipment; edge detection algorithms to delineate boundaries between different objects and a background; color segmentation to distinguish areas based on hue, saturation, and brightness values; and machine learning models trained on items and produce to optimize an identification process.

11. The point-of-sale system of claim 2, wherein the condition discrepancy comprises recognition that two different items were weighed together, an item not positioned on scale properly, an improper identification code and/or detecting a fraction of an item that is outside the scale.

12. The point-of-sale system of claim 2, wherein the item database includes item descriptions, weights, measurements, dimensions and/or prices.

13. The point-of-sale system of claim 12, wherein the item database further includes associations between various types of data and wherein the types of data include image data and reference data.

14. The non-transitory computer-readable medium of claim 3, wherein the one or more processors are further configured to identify a plurality of characteristics associated with the item in the field of view, wherein the plurality of characteristics comprise one or more of a type of item, a number of items, a number of items in a set or group, a number of items in a container, a container, a type of container, a position of the item with respect to a weighing area or a weighing surface, a weighing area or a weighing surface, a perimeter or boundary of a weighing area or weighing surface, a name of an item, a size of an item, disparate or different items and/or produce being weighed together, unintentional items placed on the weighing surface and obstructions on the weighing surface.

15. The non-transitory computer-readable medium of claim 3, wherein the one or more processors are further configured to determine the condition discrepancy using one of object recognition algorithms to differentiate between different types of items, produce, objects, components and equipment; edge detection algorithms to delineate boundaries between different objects and a background; color segmentation to distinguish areas based on hue, saturation, and brightness values; and machine learning models trained on items and produce to optimize an identification process.

16. The non-transitory computer-readable medium of claim 3, wherein the condition discrepancy comprises recognition that two different items were weighed together, an item not positioned on scale properly, an improper identification code and/or detecting a fraction of an item that is outside the scale.

17. The non-transitory computer-readable medium of claim 3, wherein the item database includes item descriptions, weights, measurements, dimensions and/or prices.

18. The non-transitory computer-readable medium of claim 17, wherein the item database further includes associations between various types of data and wherein the types of data include image data and reference data.

* * * * *